United States Patent [19]

Stroud

[11] 3,967,614
[45] July 6, 1976

[54] GAS FIRED FUSION FURNACE AND FUSION HEAD ASSEMBLY

[75] Inventor: Dale E. Stroud, Elyria, Ohio

[73] Assignee: Emerson Electric Co., St. Louis, Mo.

[22] Filed: Jan. 2, 1975

[21] Appl. No.: 538,187

[52] U.S. Cl. .............................. 126/229; 236/15 B; 432/46; 432/49
[51] Int. Cl.² .......................................... F24C 3/12
[58] Field of Search .... 126/229, 230, 234, 343.5 A; 236/15 BB, 7; 432/49, 46; 431/62

[56] References Cited
UNITED STATES PATENTS

| | | | |
|---|---|---|---|
| 1,075,991 | 10/1913 | Ruud | 237/7 |
| 1,294,504 | 2/1919 | Magee | 431/329 |
| 1,734,747 | 11/1929 | Seeley | 126/343.5 A |
| 1,855,551 | 4/1932 | Jackson | 431/62 |
| 2,085,581 | 6/1937 | Greeh | 431/153 |
| 2,106,505 | 1/1938 | Morin | 432/49 |
| 2,823,740 | 2/1958 | Morck | 236/15 B |
| 3,314,411 | 4/1967 | Power | 431/80 |

Primary Examiner—Carroll B. Dority, Jr.
Attorney, Agent, or Firm—Polster and Polster

[57] ABSTRACT

In an assembly of fusion furnace and fusion head for applying heat to plastic pieces to be fused, the furnace being fired with gaseous fuel fed through a conduit to a burner head in the furnace from a source of fuel, a temperature sensing probe projects into the furnace. The temperature sensing probe is operatively connected to a gas flow control device in the conduit from the source to the burner. The flow control device acts to throttle the gas flow, to maintain a predetermined variably selective temperature of the probe, from a high pressure, high rate of flow of gas to a low rate of flow of gas to the burner head. A fusion head block has a well in it to receive the temperature sensing probe when the fusion head block is in a predetermined heat-receiving position with respect to the burner head, the well being spaced from the burner head. The burner head is provided with a wire screen to ensure the maintenance of a flame at a reduced flow rate of the gaseous fuel.

7 Claims, 12 Drawing Figures

GAS FIRED FUSION FURNACE AND FUSION HEAD ASSEMBLY

BACKGROUND OF THE INVENTION

It has been common in the art of joining sections of heavy thermoplastic pipe in a so-called socket and saddle connection to heat a fusion head to a temperature in excess of the softening temperature of the pipe and coupling, to press the fusion head onto the end of a pipe and inside the coupling to be joined, withdraw the head and insert the softened end of the pipe into the coupling, and inside wall of which is also softened, to fuse them together. Fittings are similarly fused to pipe. Heretofore, the temperature of the fusion head has not been controlled automatically. In some heads, a thermometer has been provided by which the actual temperature of the head can be determined, but this has required that the operator remove the head from the fusion furnace at the appropriate time if the furnace is heated sufficiently to provide satisfactory recovery time.

One of the objects of this invention is to provide a fusion furnace and fusion head assembly by which the head is heated quickly, and then maintained automatically at a desired temperature.

Another object is to provide such an assembly which is reliable and safe.

Other objects will become apparent to those skilled in the art in the light of the following description and accompanying drawing.

SUMMARY OF THE INVENTION

In accordance with this invention, generally stated, in an assembly of fusion furnace and fusion head for applying heat to plastic pieces to be fused, the furnace being fired with gaseous fuel conducted from a source to a burner head in the furnace by means of a gas supply conduit, a temperature sensing probe is provided which projects into the furnace; gas flow control means are operatively connected to the sensing probe and to the gas supply conduit for changing the flow rate of the gaseous fuel to the burner, and a fusion head block is provided, having a well in it, receiving the temperature sensing probe when the fusion head block is in a predetermined heat-receiving position with respect to the burner head. The well is spaced from the burner head.

In the preferred embodiment, the fusion head block is provided with at least one open ended passage through it, one end of the passage having a burner head receiving chamber, and the fusion head block passage is spaced from the probe-receiving well. The burner head is so positioned with respect to the block chamber that flame from the burner head projects into the block chamber. The burner head is provided with a wire mesh screen to permit maintenance of a flame with a very low gas flow.

A safety thermocouple can be provided to shut off the flow of fuel in case the flame should be accidentally extinguished.

A tilt switch can also be provided to ensure that the flow of fuel is cut off in case the furnace, which may be portable, is knocked over.

DESCRIPTION OF THE PREFERRED EMBODIMENT

Figure 1:
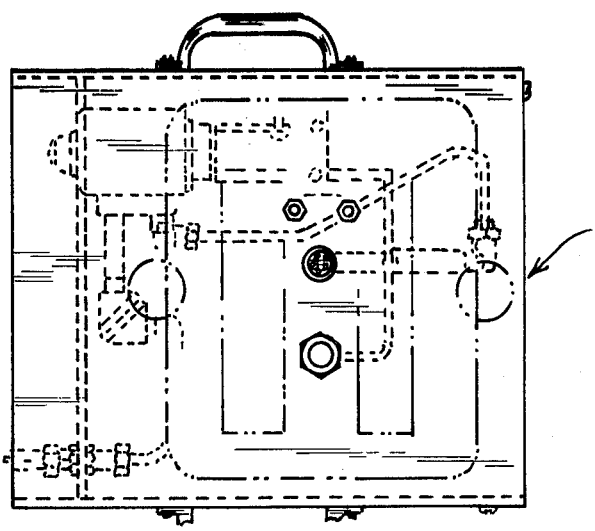
FIG. 1 is a fragmentary top plan view of one embodiment of a fusion furnace part without a shroud, of an assembly of fusion furnace and fusion head of this invention.

Referring now to FIGS. 1 through 9 of the drawings, for one illustrative embodiment of fusion furnace and fusion head assembly of this invention, reference numeral 1 indicates the entire assembly. The assembly 1 includes a fusion furnace 2 and a fusion head 5.

In this embodiment, the fusion head 5 includes a fusion head block 50. The fusion head block 50, shown in FIGS. 1 through 9, is generally circular in side elevation, with two flat faces 51 and 52, provided with tapped bolt-receiving holes 53 by which interchangeable heater faces, which complete the fusion head, are mounted in physical contact and heat transfer relation to the block 50. The heater faces are standard and are neither illustrated nor do they form a part of this invention.

Figure 8:
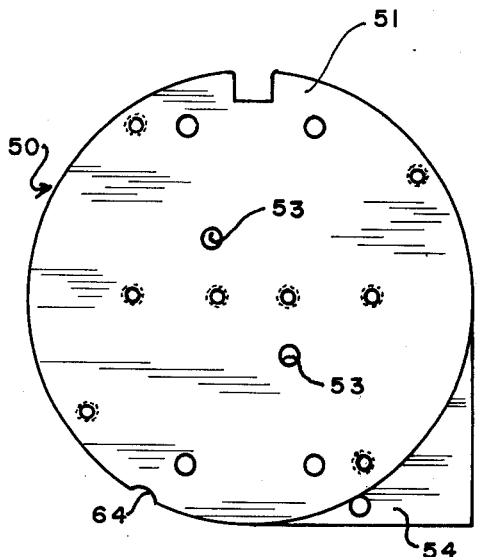
FIG. 8 is a view in side elevation of the fusion head block shown in FIG. 7.
Figure 9:
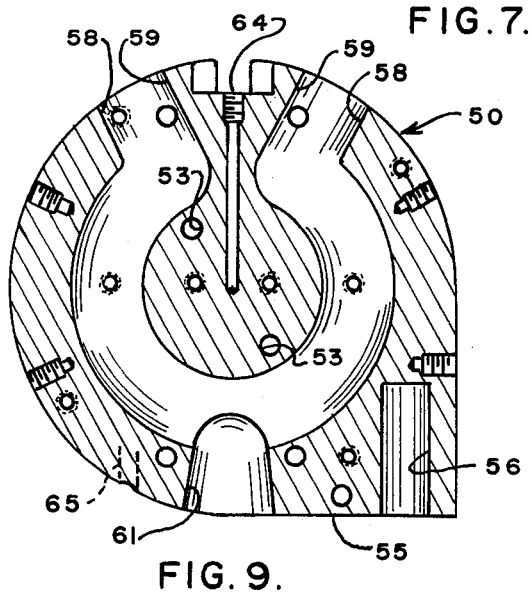
FIG. 9 is a sectional view taken along the line 9—9 of FIG. 7.

The block 50 is provided with an integral boss 54, the margins of which are defined by planes perpendicular to one another and tangent to the circle of the rest of the head block, as shown particularly in FIGS. 8 and 9. The lower edge surface of the boss 54 defines a flat base 55 for the fusion head block, and provides a body to accommodate a probe well 56, opening through the base 55 and closed at its inner end. The head block 50 of this embodiment is made of aluminum, is of substantial thickness, and is provided with a two-branched passage 58 with openings 59 through an upper part of a side surface 60, and single chamber 61, communicating with the passage 58 and opening through the base 55. A thermometer well 64 centered between openings 59, extends radially inwardly to or slightly beyond the center of the circular portion of the block 50, perpendicularly to the base 55. In this embodiment, the block is also provided with a pair of post or stanchion-receiving sockets 65, extending chordally on an axis perpendicular to the plane of the base 55.

Figure 2:
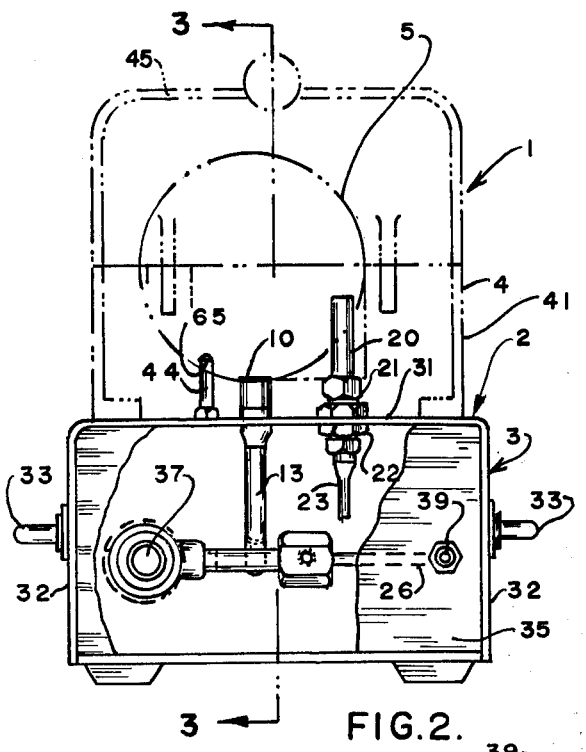
FIG. 2 is a view in side elevation, partly broken away, of the left side of the device as viewed in FIG. 1 with a shroud and one embodiment of fushion head shown in broken lines.
Figure 3:
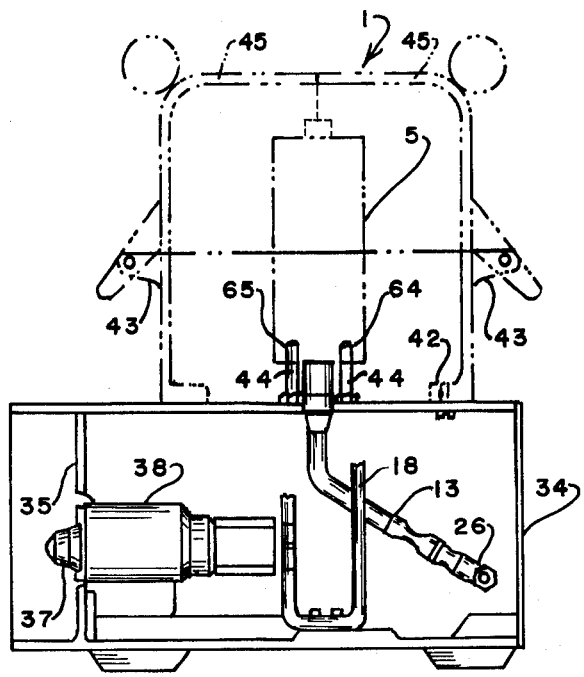
FIG. 3 is a sectional view taken along the line 3—3 of FIG. 2.
Figure 4:
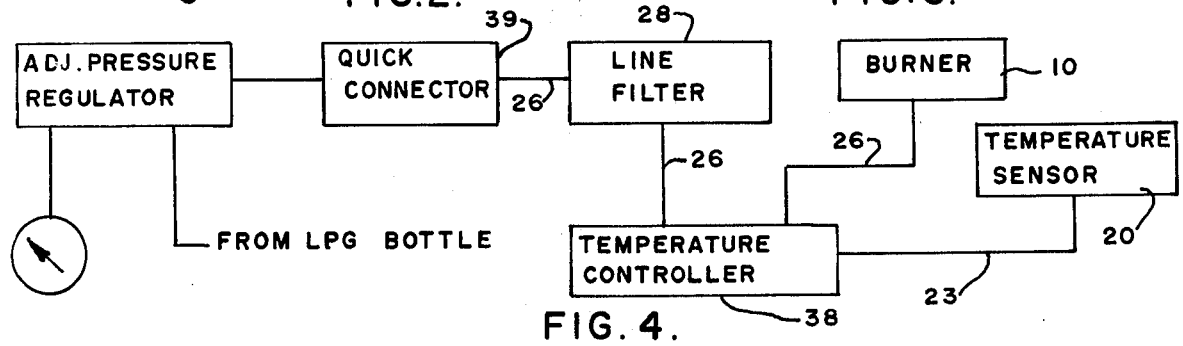
FIG. 4 is a connection diagram of elements of the furnace shown in FIGS. 1-3.
Figure 5:
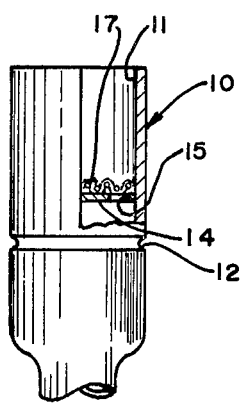
FIG. 5 is an enlarged fragmentary view, partly in section and partly broken away of a burner head of the assembly of this invention.
Figure 6:
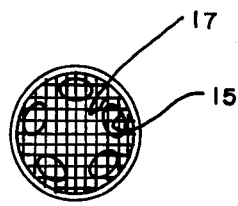
FIG. 6 is a top plan view of the burner head shown in FIG. 5.
Figure 7:
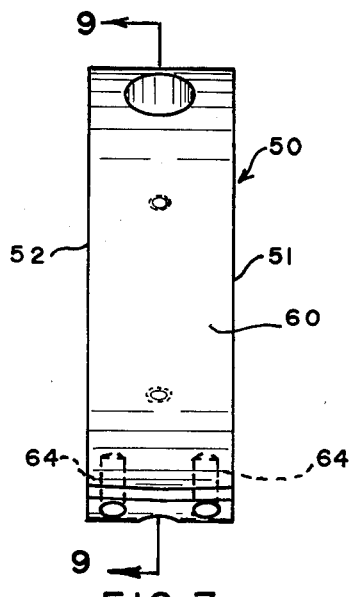
FIG. 7 is a view in edge elevation of a fusion head block of this invention.

In the embodiment shown in FIGS. 1 through 3, the fusion furnace 2 includes a control box 3 and a furnace box or shroud 4. The control box 3 includes a top supporting wall 31, side walls 32, to which handles 33 are fastened, a back wall 34, a front wall 35, and a bottom wall 36.

The shroud 4 includes a four-sided, open-topped boxing section 41, mounted on the top wall 31 of the control box by means of bolts extending through holes in the top wall 31 and into tapped pads 42 extending inwardly from the lower part of the walls of the boxing section 41. The shroud 4 also includes cover members or lids 45, hinged on hinge members 43 on opposite side walls of the boxing section, as shown in FIG. 3. The construction of the shroud is conventional.

The top wall 31 has four holes in it, two of which are tapped to receive threaded shanks of stanchions 44. Another of the holes serves to admit a burner head 10 of a burner 9, and the fourth hole to mount a probe 20. The burner 9 of this embodiment is a propane torch, such as is used in the plumbing trade, although burners adapted to use with other fuels, such as MAPP gas, for example, can also be used.

The stanchions 44, burner head 10 and probe 20 are sometimes described hereinafter as projecting into the furnace, by which is meant that they project into the enclosure of the shroud 4, which is the heating area of the furnace.

The burner 9 is supported by a burner bracket 18 mounted on the bottom wall 36, as shown in FIG. 3. The probe 20 is shown as being mounted in the top wall 31 by means of nuts 21 and 22. In this embodiment, the fusion head block 50 is supported by the upper ends of the stanchions 44, engaging the closed upper ends of the sockets 65, and the top surface of the probe 20. In this position, the burner head 10 is located so the flame from the burner head projects into the chamber 61.

The burner head 10 is cylindrical, with an open mouth 11. An aspirating section 13 of the burner is conventional.

Within the burner head and between the groove 12 and the open mouth is a distributing plate 14 with a plurality of orifices 15 equispaced around and inboard of the edge of the plate 14. Between the plate 14 and the mouth 11 is a screen 17, which, in the embodiment shown, is stainless steel 16 mesh 0.02 diameter wire screen.

Mounted to extend through the front wall 35 of the base housing 3 are a rotatable control knob 37 of a gas flow controller 38, and a quick-connect fitting 39. The gas flow controller 38 is also referred to as the temperature controller, because the temperature to which the fusion head is heated is a function of the flow of gaseous fuel to the burner 10.

A gas line or conduit 26 is connected to communicate with the quick-connect fitting 39 and to one side of the flow controller 38, and from another side of the flow controller 38 to the aspirating section of the burner. A line filter 28, in the line 26 between the quick-connect fitting 39 and the flow controller 38 is conventional.

A tube 23 communicates with and connects the probe 20 and the flow controller 38. In the embodiment shown, the probe 20 is a bulb containing mercury, the tube 23 is a capillary tube and the flow controller is a standard "Partlow" Model No. 28 controller which has the characteristic of permitting adjustment to provide throttling of a high pressure high flow of gas in response to the reaching of the probe 20 of a temperature to which the controller is set by setting of the knob 37. Ordinarily, a burner of the type described will not function under low pressure, low flow conditions, either going out or blowing back. The provision of the mesh screen permits the burner to function both in its normal way at high pressure and high flow rates and also in a holding or pilot condition.

Figure 10:
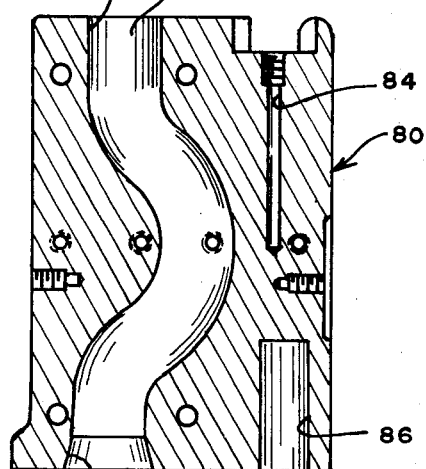
FIG. 10 is a sectional view taken along the line 10—10 of FIG. 11.
Figure 11:
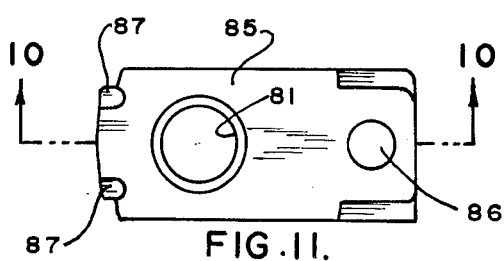
FIG. 11 is a bottom plan view of another embodiment of fusion head block.

In FIGS. 10 and 11, a different type of fusion head block 80 is illustrated. The fusion head block 80 is substantially rectangular in both side and edge elevation. It is provided with a probe receiving well 86 and a thermometer receiving well 84, and, as distinguished from the two-branched passage of the embodiment shown in FIGS. 7–9, with a single passage 88, opening at 89 through an upper surface, and opening, through a burner head receiving chamber 81, through a lower surface of base 85. Stanchion accommodating channels 87 are provided, ending in a seat surface against which the ends of the stanchions 65 rest.

In the operation of this embodiment, a propane gas tank is connected, by way of a shut off valve, pressure regulator, gas line and complementary quick connect fitting, to the quick connect fitting 39. The knob 37 is turned to the place at which a pointer, not here shown, indicates the desired temperature. The propane tank shut-off valve is opened and the gas issuing from the burner head 10 is ignited. A fusion head is then placed on the probe 20 and stanchions 44, with the mouth of the burner 10 in the chamber 61, by means of handles, not here shown. The burner 9 operates at its optimum efficiency because the gas being supplied it is at its usual high pressure and high rate of flow, thus heating the fusion head rapidly. When the predetermined temperature to which the flow controller 38 has been set is reached, the mercury in the temperature sensing probe 20 acts to move a plunger within the temperature controller to throttle the flow of gas to the burner and reduce its pressure, to reduce the flame to a point at which the temperature of the fusion head is maintained constant, or decreases very slowly. In the latter case, the cooling of the fusion head only a few degrees reopens the flow controller quickly to restore the fusion head to its desired temperature. Although it is not illustrated in FIGS. 1–4, in this embodiment as in the embodiment described hereinafter, the size of the flame in the pilot or by-pass condition can be controlled by a needle-type by-pass contained in the controller 38, which is accessible through an opening in the front wall 35.

Figure 12:
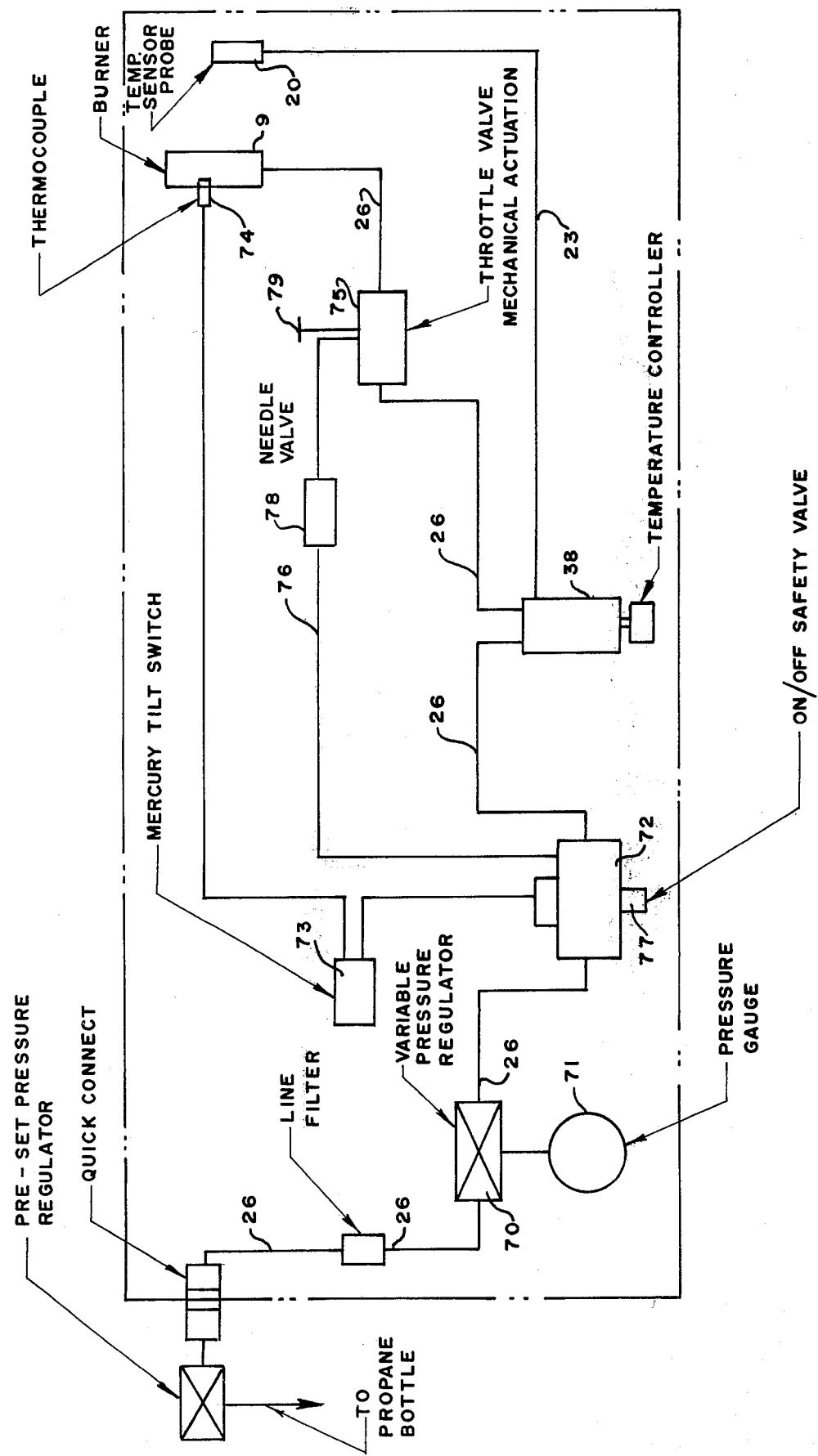
FIG. 12 is a connection diagram showing the elements of another embodiment of fusion furnace part of an assembly of this invention, and their interconnection.

Referring now to FIG. 12, a more elaborate fusion furnace control system is illustrated diagrammatically. In this embodiment, a pressure regulator 70 and pressure gage 71 are housed in the control box 3, with the pressure gage mounted in an opening in the front wall 35. An on-off solenoid type safety valve 72, in the gas line 26, is electrically connected to a mercury tilt switch 73 and a thermocouple 74 in immediate heat transfer relation to the flame of the burner 9. The safety valve 72 has a button or plunger 77 which projects through an opening in the front wall 35. In the line 26 between the temperature controller 38 and the burner 9, a throttle valve 75 is also provided, with a plunger 79, shown schematically, to mechanically lower the flame size of the main flame when the covers 45 are opened. By means of a needle valve 78 inside the control box, the size of the flame in the holding or pilot condition can be adjusted.

The safety valve 72 operates in the usual way. Depressing the button 77 in a pilot position opens a valve by a bypass line 76 which communicates through the needle valve 78 and the throttle valve 75 with the burner 9, which can then be lighted. Heating of the thermocouple 74 energizes the holding solenoid in the safety valve, after which the plunger button 77 can be released. Turning of the control knob on to position then opens the entire main gas line 26 from the quick-connect to the burner. If the flame at the burner is extinguished, cooling of the thermocouple reduces the current to the solenoid in the safety valve below the holding condition, and the valve closes. Similarly, if the furnace is tilted more than a predetermined angle from the horizontal, the mercury tilt switch opens, breaking the circuit from the thermocouple, and causing the solenoid to release the valve to close the safety valve.

Numerous variations in the construction of the assembly of this invention, within the scope of the appended claims, will occur to those skilled in the art in the light of the foregoing disclosure.

Having thus described the invention, what is claimed and desired to be secured by Letters Patent is:

1. In an assembly of fusion furnace and mountable and demountable fusion head for applying heat to plastic pieces to be fused, said fusion head including a fusion head block and said furnace being fired with gaseous fuel conducted, by means of a gas supply conduit, from a source to a burner having a burner head projecting upwardly into said furnace, the improvement comprising a temperature sensing probe projecting upwardly into said furnace parallel to said burner head, gas flow control means operatively connected to said temperature sensing probe and to said gas supply conduit for changing the flow rate of gaseous fuel to said burner from a rapid flow to a relatively low but continuous flow and vice versa, said low flow being insufficient to raise the temperature of said fusion head beyond a predetermined level; and said fusion head block having at least one open-ended passage therethrough, one end of said passage having a burner head receiving chamber, and a well in said fusion head block receiving said temperature sensing probe when said fusion head block is mounted in said fusion furnace with the said burner head in said burner head receiving chamber, said well being spaced from, parallel to and physically separated from said burner head receiving chamber.

2. The improvement of claim 1 wherein said temperature sensing probe comprises means acting at a predetermined temperature for throttling said gas abruptly to a relatively low flow rate to provide a flame incapable of raising the temperature of said fusion head substantially above said predetermined temperature under normal ambient conditions.

3. The improvement of claim 1 wherein the said burner head is provided with a mesh screen positioned on the mouth side of a distributing plate in said burner head.

4. The improvement of claim 1 including a solenoid type safety valve in said gas supply conduit between said source and said burner, and thermocouple means in heat transfer relationship with flame at said burner head and electrically connected to said safety valve.

5. The improvement of claim 4 wherein a tilt switch is electrically connected between said thermocouple and said safety switch, whereby tilting of said control box breaks electrical connection between the thermocouple and said safety valve.

6. The improvement of claim 1, wherein said fusion furnace includes covers hinged to be opened and closed, and a throttle valve and plunger are mechanically associated with said covers to lower the flame when the covers are opened.

7. The improvement of claim 6 including a needle valve for adjusting the size of flame in the lowered condition.

* * * * *

UNITED STATES PATENT OFFICE
CERTIFICATE OF CORRECTION

Patent No. 3,967,614      Dated July 6, 1976

Inventor(s) Dale E. Stroud

It is certified that error appears in the above-identified patent and that said Letters Patent are hereby corrected as shown below:

Column 5, line 8, "knob on to position" should be "knob to on position".

Signed and Sealed this

Twenty-first Day of September 1976

[SEAL]

Attest:

RUTH C. MASON
*Attesting Officer*

C. MARSHALL DANN
*Commissioner of Patents and Trademarks*